United States Patent [19]

Crawford

[11] Patent Number: 5,675,942
[45] Date of Patent: Oct. 14, 1997

[54] WALL PANEL ALIGNMENT DEVICE AND SPACER

[76] Inventor: Van Crawford, 818 Palmetto St., Georgetown, S.C. 29440

[21] Appl. No.: 520,163

[22] Filed: Aug. 28, 1995

[51] Int. Cl.⁶ .................................................. E04B 1/00
[52] U.S. Cl. .............................. 52/127.3; 52/509; 52/391
[58] Field of Search ........................... 52/126.1, 127.3, 52/385, 386, 387, 389, 508, 509, 510, 749.1, 746.1, 514; 269/49

[56] References Cited

U.S. PATENT DOCUMENTS

| | | | |
|---|---|---|---|
| 2,769,212 | 11/1956 | Hammitt et al | 20/4 |
| 4,397,125 | 8/1983 | Gussler, Jr. | 52/127.3 |

*Primary Examiner*—Carl D. Friedman
*Assistant Examiner*—Creighton Smith
*Attorney, Agent, or Firm*—Gerald Boss; Henry S. Jaudon; Cort Flint

[57] ABSTRACT

An alignment device including a base plate, locking stem, locking plate and lock maintains the front and back sides of a pair of adjacent wall mounted panels of similar thickness in lateral alignment while an adhesive applied to the panels cures for providing a smooth front surface is provided. The base plate includes a lateral surface for bracing the pair of panels in a common lateral back plane. A locking plate includes a lateral surface for bracing the pair of panels in a common lateral front plane. A lock is carried by the locking plate for engaging the locking stem locking the locking plate firmly in place with respect to the base plate for sandwiching the adjacent panels between the locking plate and base plate maintaining the back sides of the adjacent panels along the common lateral back plane and the front sides of the adjacent panels along the common lateral front plane.

14 Claims, 4 Drawing Sheets

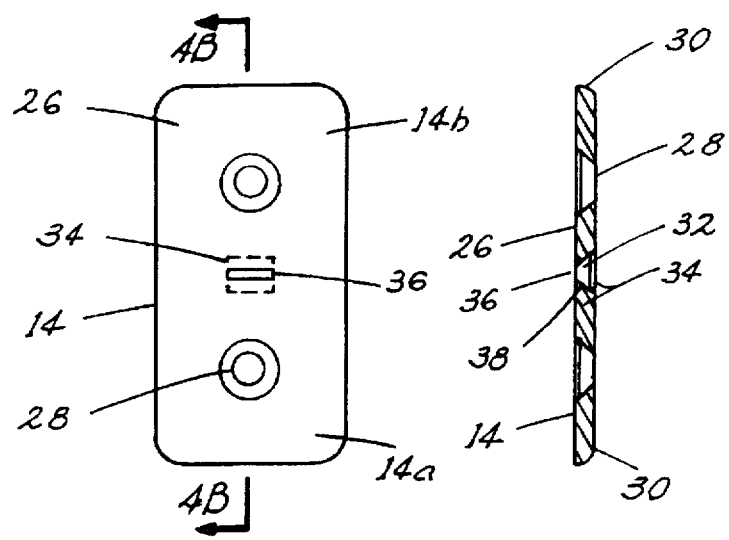
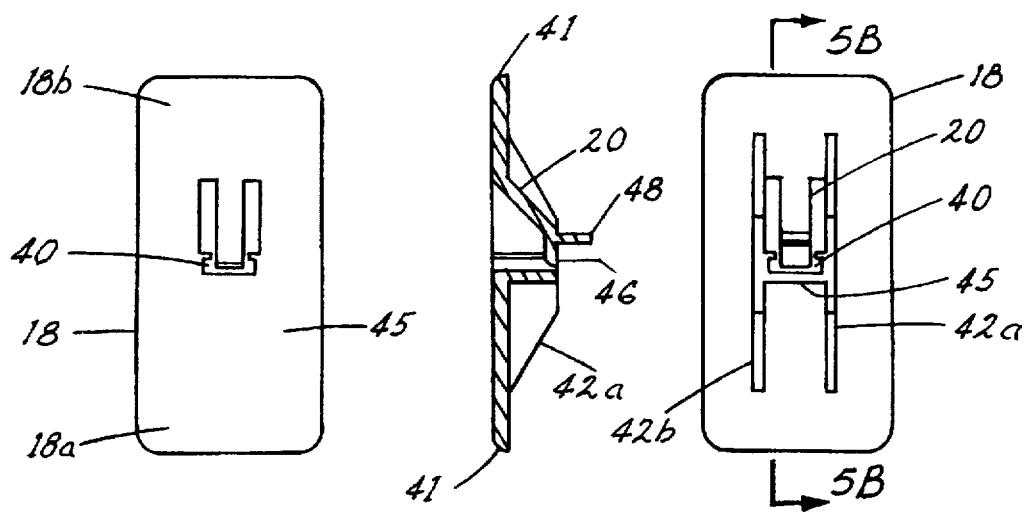
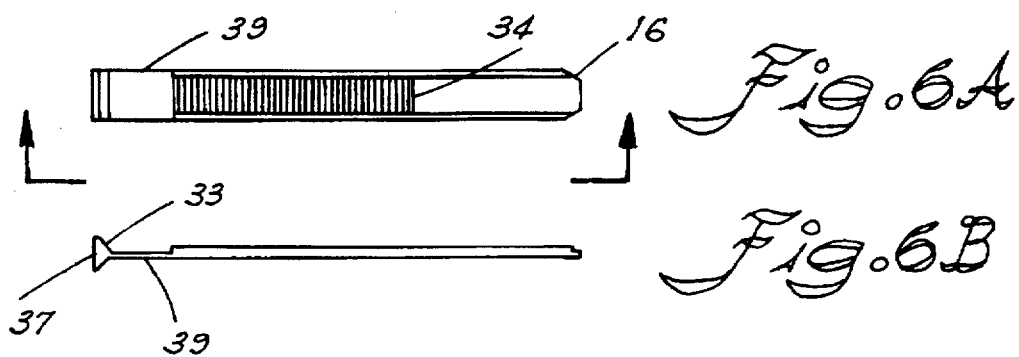

WALL PANEL ALIGNMENT DEVICE AND SPACER

BACKGROUND OF THE INVENTION

This invention relates to an alignment device in general, and more particularly to an alignment device for aligning panels mounted to uneven surfaces which is quick and easy to use.

Wall mounted panels such as mirrored surfaces are applied to wall surfaces with the use of an adhesive known as mastic. A problem arises in that the dry wall to which the panels are attached are often warped and bow in various directions. When the panels are attached to the warped and uneven wall surface the panels are unaligned and have misaligned edges. This results in uneven seams which are unsightly and rough to the touch. Furthermore, the glass panels easily chip when they accidently contact each other and in attempting to align adjacent panels the panels frequently are chipped.

Currently, to overcome the unevenness of the wall surface, the wall mounted panels are temporarily aligned and poles of various lengths are used to brace the wall mounted panels with respect to the floor while the mastic cures. The object of this method is to enable the curing mastic to compensate for the wall's unevenness. However, it is very cumbersome to manually align the wall mounted panels and brace the panels with the poles while maintaining an approximate alignment of the panels. Furthermore, this method is inexact and generally does not produce aligned wall panels.

As an alternative method to counter the unevenness of the walls, suction cups are used for positioning panels in alignment by drawing a panel flush with another panel. Once the panels are flush, shims are placed behind the panels against the wall for maintaining the panels in alignment. This method is also cumbersome and inexact.

U.S. Pat. No. 4,397,125 discloses a system for aligning panel sections of uneven thickness. The system utilizes metallic clips having resilient portions which bend from the weight of the tile or lift the tile upward. Such a system is designed for the application of a large pressure for bending the resilient portions. This system is inappropriate for mirrored surfaces since large forces of pressure applied to the panels' edges may possibly result in chipping the glass edges.

Accordingly, an object of the present invention is to provide a simple alignment device which is easy to use;

Also, an object of the present invention is to provide a simple alignment device which is easy to manufacture;

Another object of the present invention is to provide an alignment device for installing glass panels on walls which is easy to use and which is glass-friendly preventing chipping of the glass panels;

Yet another object of the present invention is to provide an alignment device having a joint spacer for spacing the aligned wall panels preventing the wall panels from contacting each other and chipping.

SUMMARY OF THE INVENTION

The above objectives are accomplished according to the present invention by providing an alignment device for aligning and locking two adjacent wall mounted panels in a flush relationship. The alignment device includes a base plate having a lateral surface for bracing the rear sides of a first and second adjacent panel along a common lateral back plane. A locking stem extends outward from the base plate and provides a resilient spacer between the adjacent panels preventing the panels from touching at installation and in the event of any settling of the house. By preventing the panels from touching, the risk of the glass panels chipping is reduced.

The alignment device further includes a locking plate including a lateral surface for bracing the front sides of the first and second adjacent panels along a common lateral front plane. The locking plate is carried by the locking stem for positioning the lateral surface against the front sides of the adjacent panels. A lock carried by the locking plate engages the locking stem locking the locking plate firmly in place with respect to the base plate for sandwiching the adjacent panels between the locking plate and base plate maintaining the back sides of the adjacent panels along the common lateral back plane and the front sides of the adjacent panels along the common lateral front plane.

The alignment device aligns the adjacent panels along a common front plane and back plane and locks the panels in planar alignment during the curing of an adhesive. This results in adhering the panels to a wall with the front sides of the adjacent panels in alignment notwithstanding any unevenness in the wall's surface.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIGS. 4A and 4B illustrate a front and side elevation of a base plate of an alignment device according to the invention FIGS. 5A, 5B and 5C illustrate a front, side and back elevation of a locking plate according to the invention;

FIGS. 6A and 6B illustrate a top plan view and side elevation of a locking stem according to the invention;

DESCRIPTION OF A PREFERRED EMBODIMENT

Referring now in more detail to the drawings, the invention will now be described in more detail.

Figure 1:
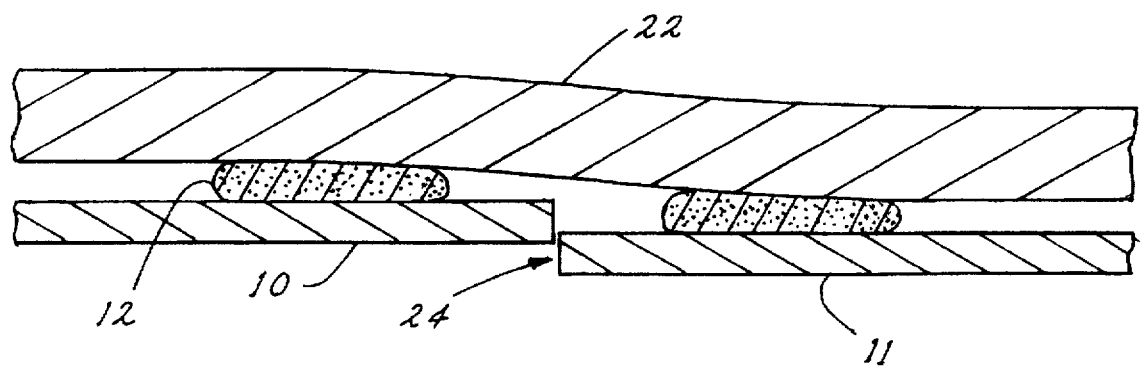
FIG. 1 is a top view of two unaligned panels illustrating the current problem of having wall mounted panels unaligned when the wall surface is warped.

FIG. 1 shows the current problem associated with mounting a pair of wall panels to wall 22 having a warped uneven surface. If the mirrored panels 10, 11 are applied directly to wall 22 which is warped and bowed, panels 10 and 11 will not mount in alignment and uneven seam 24 will result.

Figure 2:
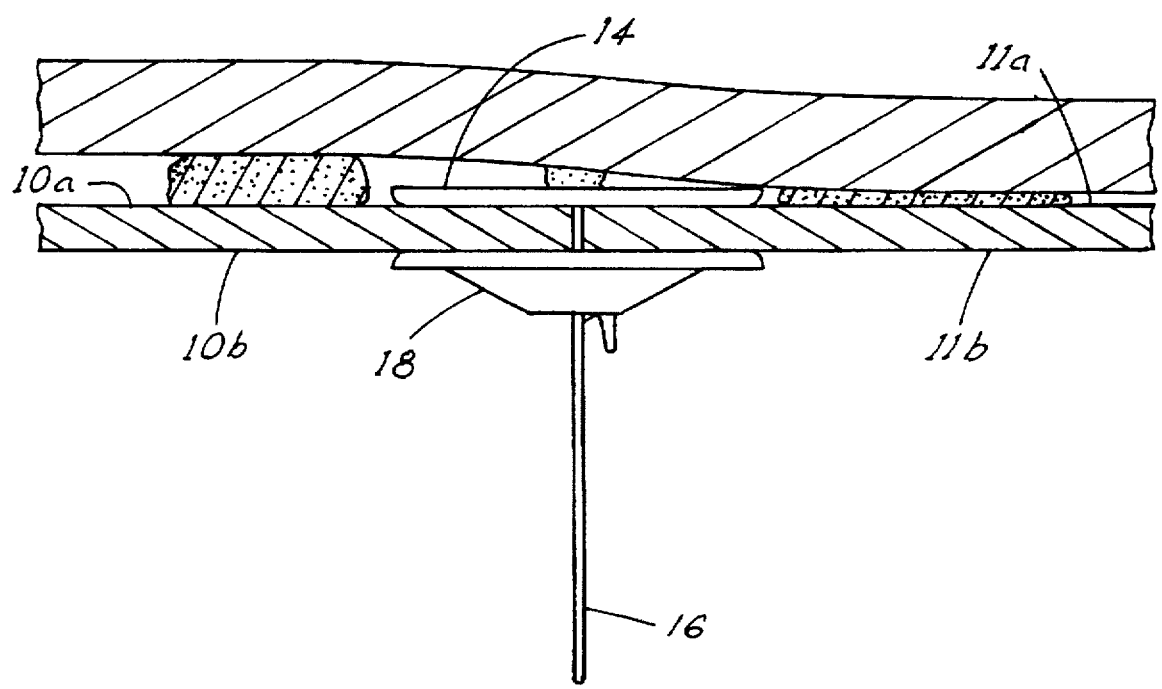
FIG. 2 illustrates an alignment device according the invention aligning and locking adjacent panels in place while mastic cures for countering the unevenness of a wall surface.
Figure 3:
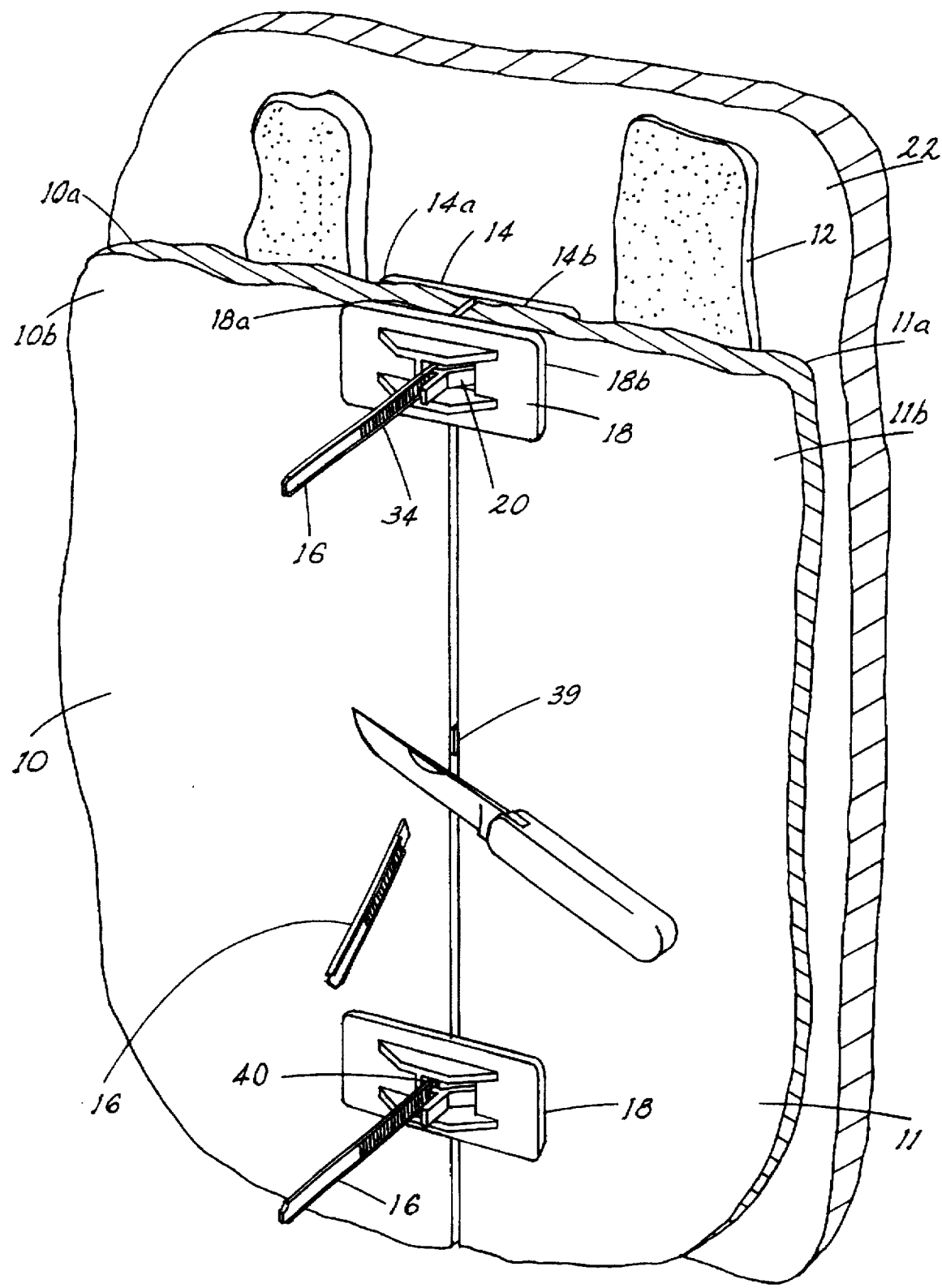
FIG. 3 illustrates a plurality of alignment devices according to the invention aligning and locking adjacent panels in place and the trimming of the locking stem to provide a smooth seam and a spacer joint preventing the chipping of the panels edges.
Figure 7A:
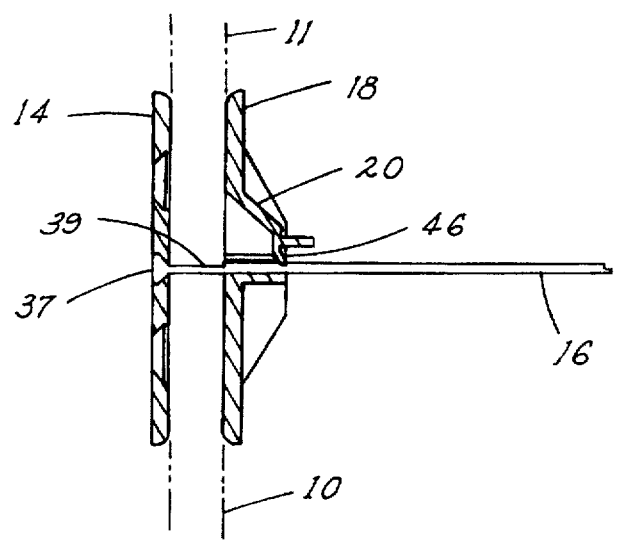
FIG. 7A illustrates a sectional view through adjoining panels of an alignment device according to the invention aligning and locking adjacent panels in place.

As shown in FIGS. 2, 3 and 7A alignment device A maintains the front and backside of a pair of adjacent wall mounted panels 10, 11 of similar thickness in lateral alignment while an adhesive such as mastic 12 applied to panels 10, 11 cures. As the mastic cures, the mastic compensates for the unevenness of the wall's surface enabling the panels to be flush.

Alignment device A includes base plate 14 having first rear panel contact surface 14a and second rear panel contact surface 14b aligned in a common lateral back plane. First rear panel contact surface 14a contacts backside 10a of first panel 10 and second rear panel contact surface 14b contacts backside 11b of second panel 11 for constantly supporting panels 10 and 11 along the common lateral back plane.

Locking stem 16 extends outward from base plate 14 for being disposed between the opposite sides of adjacent panels 10, 11 defining a spacer preventing the panels from touching each other during installation preventing the panels from chipping. Also, after installation of the wall panels, a portion of locking stem 16 will be maintained between the panels for constantly providing spacer 39 separating the panels. Spacer 39 prevents the panels from contacting each other should the house settle thereby preventing the panels from chipping. Locking stem 16 includes a plurality of locking indexes 34, which will be described in more detail hereinafter, which enables locking plate 18 to be placed in a precise incremental locking position for firmly aligning and locking panels 10 and 11.

Locking plate 18 is utilized for maintaining the front sides of panels 10 and 11 in alignment along a common front plane. Locking plate 18 includes first front panel contact surface 18a and second front panel contact surface 18b aligned in a common lateral front plane. First front panel contact surface 18a contacts the front side 10b of first panel 10 and second front panel contact surface 18b contacts the front side 11b of second panel 11 for supporting panel 10 and 11 along the common lateral front plane. Locking plate 18 is carried by locking stem 16 for positioning first and second front pane contact surfaces 18a and 18b against front side 10b and 11b of adjacent panels 10, 11. Lock 20 is carried by locking plate 18 for engaging locking stem 16 locking locking plate 18 in place with respect to base plate 14 for sandwiching adjacent panels 10, 11 between locking plate 18 and base plate 14 for maintaining backsides 10a and 11a of adjacent panels 10, 11 along the common lateral back plane and front sides 10a and 10b along the common lateral front plane.

FIG. 2 illustrates bowed wall 22 with mirrored panels 10, 11 attached to the wall using adhesive 12 while being maintained in a frontal and back plane alignment with flush edges by alignment device A while adhesive 12 cures. In this situation, adhesive 12 cures in a manner which compensates for the bowed surface area of the wall 22 thereby insuring flush edges and a smooth frontal surface and seam.

As shown in FIGS. 3, 4A and 4B, in the preferred embodiment, base plate 14 includes lateral base surface 26 which defines first and second rear panel contact surfaces 14a and 14b. The smooth lateral surface braces the backsides 10a and 11a of first and second panels 10 and 11 along the entire length of base plate 14 for evenly applying pressure to the backsides of panels 10 and 11 preventing too much pressure to be positioned against a particular point of the edge of either panels 10, 11 which may result in accidental fracturing of the mirrored panels. In the preferred embodiment, base plate 14 is only 1/16th of an inch thick thereby enabling the mirror to be placed in close proximity to drywall 22. Base plate 14 may include securing holes 28 for securing base plate 14 against wall 22 securing base plate 14 in place. This is advantageous when securing a glass plate against the wall where an adjacent panel is not used. Also, if the drywall is smooth, the base plate may be directly secured to the wall without risk of securing the panels unaligned.

In the preferred embodiment, base plate 14 is molded from a plastic such as polyethylene or polypropylene. Base plate 14 is rigid for maintaining panels 10 and 11 in alignment, but also has some minimal resilient properties common to polyethylene or polypropylene preventing base plate 14 from scratching the panels enabling base plate 14 to be glass-friendly. Also, base plate 14 includes smooth rounded edges 30 further minimizing the risk of chipping the edge of mirrored panels 10 or 11. Base plate 14 further includes locking stem aperture 32 for receiving locking stem 16. Locking stem aperture 32 includes a back opening 34 and front opening 36. Back opening 34 is of a larger width than front opening 36. Inclined aperture walls 38 extend from the outward width of back opening 34 to the outside width of front opening 36 at an inclined angle for defining a trapezoidinal retainer for receiving the base of locking stem 14 which will be described hereinafter.

Figure 7B:
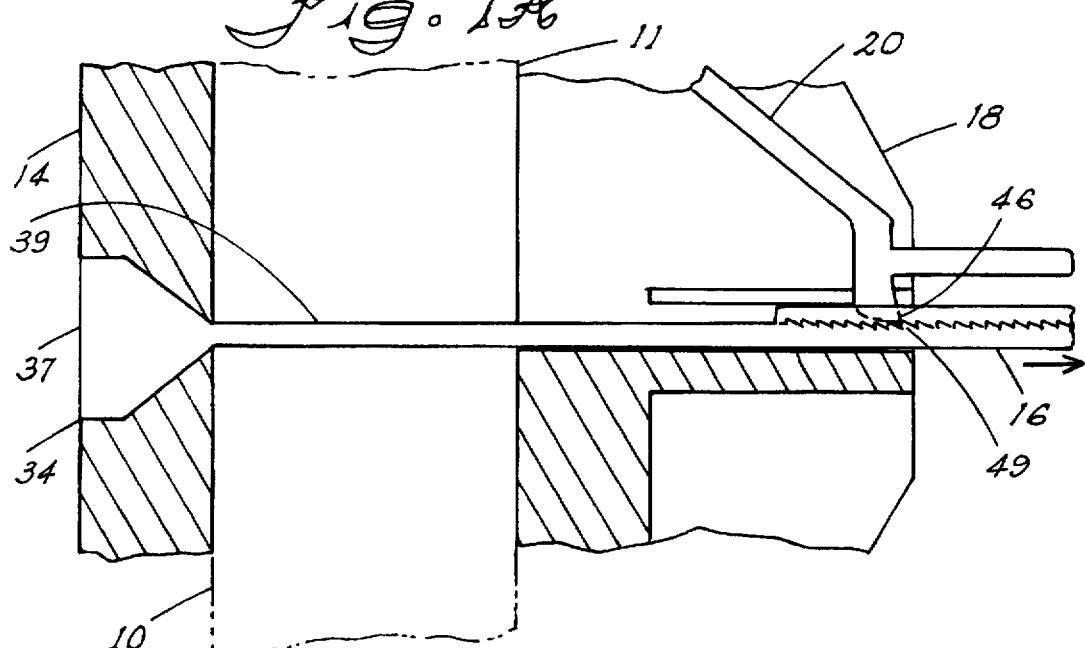
FIG. 7B illustrates a section view through adjoining panels of a locking means engaging the locking stem according to the invention.

As shown in FIGS. 3, 6A and 6B, locking stem 16 includes a locking stem base 37 which includes a trapezoidinal profile with inclined sides 33 extending from locking stem base 37 to spacer web 39 such that locking stem base 37 base is wider than spacer web 39. Locking stem 16 has a height equal the height of locking stem aperture 32 for being received through locking stem aperture 32. As shown in FIGS. 7A and 7B, in operation, locking stem 16 snaps into place with base plate 14. Locking stem 16 is passed from the back of base plate 14 through back opening 34 and through front opening 36. The corresponding trapezoidinal configurations of locking stem aperture 32 and locking stem base 37 retains locking stem 16 with base 14 by preventing locking stem base 37 from passing through front opening 36 of locking stem aperture 32. Also, the back of locking stem base 37 is flush with the back of base plate 14.

Locking stem 16 has elastic properties and is manufactured from an elastomeric material such as thermoplastic elastomer known as ethylene vinyl acetate. Locking stem 16 includes a plurality of adjacent locking indexes 34 which extend generally along the length of locking stem 16. The elastic properties of locking stem 16 enables locking stem 16 to stretch creating tension along locking stem 16 which will compress locking plate 18 against panels 10 and 11 when lock 20 engages a respective of locking index 34. Also, the elastic properties enables spacer web 39 to bend compensating for the settling of the house while still separating the two panels. By bending, no stress is applied to the panel edges by spacer web 39 otherwise the existence of stress would increase the likelihood that the panels would chip.

In the preferred embodiment, locking indexes 34 commence a partial distance along locking stem 16 away from base plate 14 when locking stem 16 is received by base plate 14. The partial separation distance between locking indexes 34 and base plate 14 defines thin spacer web 39 which is generally a quarter inch in length and which will serve as a spacer between adjacent panels 10 and 11 during and after mounting. Locking stem 16 has a flat longitudinal cross section with a width of approximately 1/16th of an inch providing spacing of approximately 1/16th of an inch between panels 10 and 11. In the preferred embodiment, locking indexes 34 are comprised of inclined ridges which extend away from base plate 14 when locking stem 16 is received by base plate 14. The inclined ridges each fall away into a trough from which an adjacent inclined ridge commences, thereby defining a serrated pattern.

As shown in FIGS. 5A, 5B, 5C, 7A and 7B, locking plate 18 has a smooth lateral locking surface 45 for defining first front panel contact surface 18a and second front panel contact surface 18b. The smooth lateral back surface braces the frontsides 10b and 11b of first and second panels 10 and 11 along the entire length of locking plate 18 for evenly applying pressure to the sides of panels 10 and 11. Locking plate 18 also includes rounded edges 41 for decreasing the chance of chipping the mirrored panels. Locking plate 18 is made from polypropylene or polyethylene and like base plate 14 has some resiliency for making locking plate 18 glass friendly preventing locking plate 18 from scratching the glass surfaces. Locking plate 18 includes locking stem channel 40 for receiving locking stem 16. Reinforcing ribs 42a and 42b extend outward from the front surface of locking plate 18 for providing locking plate 18 with stiffness for ensuring that locking plate 18 maintains firm contact with panels 10 and 11 when compressed against the panels maintaining the edges flush. Reinforcing ridges 42a and 42b also provide a gripping surface for the user to grasp locking plate 18 and place locking plate 18 over locking stem 16. In the preferred embodiment, locking stem channel 40 is defined by a C-shaped brace 43 intermediary placement ridges 42a and 42b.

In the preferred embodiment, lock 20 includes resilient lock extension member 44 which extends outward from locking plate 18 at an acute angle which terminates in a generally horizontal locking finger 46. Lock 20 is disposed intermediary placement ridges 42a and 42b enabling locking finger 46 to engage a respective of locking indexes 34 of locking stem 16 when locking stem 16 is received through locking stem channel 40. Release tab 48 extends generally perpendicular outward from locking finger 46 enabling locking finger 46 to be disengaged from locking stem 16 by pivoting lock extension member 44 away from locking stem 16.

Of course, alignment device A may be used to align any set of panels together requiring planar alignment. For instance, in the welding industry, it is common that two sheets of metal need to be welded together in alignment. Accordingly, as previously described herein for aligning the mirrored panels, these metal panels may also be aligned by placing the base plate behind the metal panels with the locking stem protruding between the metal panels with the locking plate in place locking the two metallic panels in alignment while the panels are welded together.

OPERATION

Figure 7C:
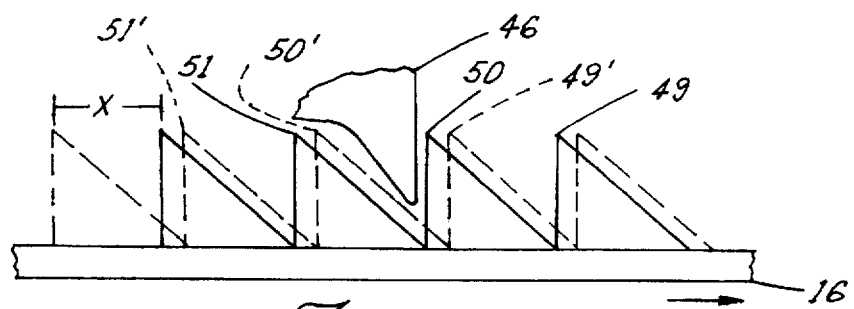
FIG. 7C is an exploded sectional view of the locking indexes.

As shown in FIGS. 7A, 7B and 7C, in operation, locking stem 16 is positioned through locking stem aperture 32 of base plate 14 and in combination with base plate 14 is positioned behind a first panel 10 and moved laterally until panel 10 engages spacer web 39. This operation would be incurred for aligning any type of panels. When applying wall mounted mirrored panels, mastic may be applied to base plate 14 to retain base plate 14 in position. Once base plate 14 and locking stem 16 are in position with respect to first panel 10, second panel 11 is positioned on the opposite side of spacer web 39 thereby placing the backside of panels 10, 11 in a common lateral back plane as defined by base plate 14. Spacer web 39 prevents the edges of the panels from contacting reducing the risk that the glass panels may chip. After panels 10, 11 are in position with respect to base plate 14, locking plate 18 is slidably positioned over locking stem 16 with locking stem 16 being received through locking stem channel 40 of locking plate 18 until the back of locking plate 18 engages the front surfaces of panels 10, 11.

As locking plate 18 is carried along locking stem 16 towards panels 10 and 11, lock extension member 44 passes over several respectives of locking indexes 34. Each time a respective of locking indexes 34 passes by lock extension 44, lock extension engages the locking index. However, if room permits lock extension member 44 slides over the inclined locking index to fit into a trough of the next locking index. With the locking indexes in close proximity with one another, locking plate 18 may be precisely positioned in incremental locking positions until locking plate 18 abuts panels 10 and 11 with lock extension member 44 received within the trough of a respective locking index locking locking plate 18 in place.

As shown in FIGS. 7B and 7C, after locking plate 18 initially abuts panels 10 and 11, locking stem 16 is stretched from a first unstretched position to a second stretched position and pressure is applied to lock extension member 44 forcing lock extension member 44 to slide up the inclined ridge of the locking index first encountered when locking plate initially abutted panels 10 and 11. Locking stem 16 is stretched axially along its length with respect to locking plate 18.

FIG. 7C illustrates the stretching of locking stem 16 and the positioning of locking indexes 49, 50, and 51 with locking finger 46 being received within the trough of locking indexes 50 and 51. In this stretched position, locking stem 16 is locked under tension creating a reactive compression force on locking plate 18. The positions of locking indexes 49, 50 and 51 prior to stretching are illustrated by the dotted outlines of 49', 50', and 51' with 49' being the unstretched position of locking index 49 and 50' corresponding with the unstretched position of locking index 50 and 51' corresponding with the unstretched position of locking index 51 respectively. Prior to stretching, locking finger 46 was received within the trough of locking indexes 49 and 50 until locking stem 16 was stretched the illustrated distance x which would generally correspond to the distance to the next trough. Consequently, locking finger 46 is received within the trough of an adjacent locking index locking locking plate 18 in place while locking stem 16 is in tension. This results in compressing locking plate 18 and base plate 14 towards each other firmly holding panels 10 and 11 in alignment.

As shown in FIG. 3, once mastic 12 cures in place, the backsides of wall panels 10 and 11 are maintained in alignment thereby insuring that the front sides of panels 10 and 11 are also in alignment. Release tab 48 disengages locking finger 46 from locking stem indexes 32 and locking plate 14 is slidably removed from locking stem 16. Locking stem 16 is then cut flush against the front side of panels 10 and 11 thereby providing spacer web 39 as a spacer between wall panels 10 and 11 preventing the panels from contacting each other after installation which may result in the panels chipping.

While a preferred embodiment of the invention has been described using specific terms, such description is for illustrative purposes only, and it is to be understood that changes and variations may be made without departing from the spirit or scope of the following claims.

What is claimed is:

1. A panel alignment device for aligning and locking adjacent edges of surface mounted panels in a flush relationship which compensates for uneven lateral surfaces, said alignment device comprising:

a base plate of a general length having a first rear panel contact surface and a second rear panel contact surface, said first and second rear panel contact surfaces being in a common lateral back plane, said first rear panel contact surface for contacting a back side of a first panel and said second rear panel contact surface for contacting a back side of a second adjacent panel for supporting said panels along said common lateral back plane;

said base plate includes a smooth lateral surface defining said first and second rear panel contact surfaces for contacting the back sides of said first and second panel generally along the entire length of said base plate;

a locking stem of a general length extending outward from said base plate defining a spacer for being disposed between opposite sides of said adjacent panels for preventing said panels from touching;

a locking plate of a general length having a first front panel contact surface and a second front panel contact surface, said first and second front panel contact surfaces being in a common lateral front plane, said first panel contact surface for contacting a front side of said first panel and said second front panel contact surface for contacting a front side of said second panel for supporting said panels along said common lateral front plane;

a locking stem channel formed within said locking plate for receiving said locking stem, said locking plate carried by said locking stem for positioning said first and second front panel contact surfaces against said front sides of said adjacent panels; and a lock carried by said locking plate for engaging said locking stem locking said locking plate in place with respect to said base for sandwiching said adjacent panels between said locking plate and base plate for maintaining said back sides of said adjacent panels along said common lateral back plane and said front sides of said adjacent panels along said common lateral front plane;

so that said adjacent panels may be aligned along a common front plane and back plane during curing of an adhesive adhering said panels to a wall with the front sides of said adjacent panels in alignment notwithstanding any unevenness in the lateral surface.

2. The alignment device of claim 1 wherein said locking plate includes a smooth lateral surface defining said first and second front panel contact surfaces for contacting the front sides of said first and second panels generally along the entire length of said locking plate.

3. The alignment device of claim 1 wherein said locking stem includes a flat longitudinal cross section.

4. The alignment device of claim 1 wherein said locking stem includes a plurality of adjacent locking indexes extending incrementally generally along the length of said locking stem, said lock including an engaging element for engaging a respective of said locking indexes.

5. The alignment device of claim 4 wherein said base plate includes a locking stem aperture for receiving said locking stem.

6. The alignment device of claim 5 wherein said base plate includes a back opening formed within a back of said base plate and a front opening formed within a front of said base plate, said base plate including locking stem aperture walls which in conjunction with said back opening and front opening define said locking stem aperture, said back opening being wider than said front opening, said locking stem including a locking stem base having a width generally equal to said back opening so that said locking stem is retained within said locking stem aperture by said locking stem base being received in said back opening and engaging said locking stem aperture walls.

7. The alignment device of claim 6 wherein said locking stem includes a thin spacer web disposed between said locking stem base and said locking indexes providing a buffer for separating adjacent sides of said adjacent panels.

8. The alignment device of claim 7 wherein said thin spacer web is approximately a quarter of an inch in length.

9. The alignment device of claim 1 wherein said locking plate includes a pair of parallel reinforcement ribs for reinforcing said locking plate.

10. The alignment device of claim 9 wherein said reinforcing ribs are connected by a C-shaped brace, said C-shaped brace having an interior defining said locking stem channel.

11. The alignment device of claim 1 wherein said locking stem includes a plurality of locking indexes and said lock includes a lock extension member extending from a front side of said locking plate terminating in a generally horizontal locking finger for engaging a respective of said locking indexes.

12. The alignment device of claim 11 including a release tab integral with said lock for releasing said locking finger when said locking finger is engaged with a respective of said locking indexes.

13. The alignment device of claim 1 wherein said base plate and locking plate are made from a first type of plastic and said locking stem is made from a second type of plastic providing said locking stem with elasticity.

14. The alignment device of claim 1 wherein said locking stem is resilient enabling said locking stem to stretch for placing said locking stem in tension by said lock engaging a respective of said locking index for applying a compression force against said locking plate firmly securing said first and second panels between said base plate and locking plate.

* * * * *